No. 802,946. PATENTED OCT. 24, 1905.
I. G. WATERMAN.
ELECTROMAGNETIC VALVE.
APPLICATION FILED JUNE 25, 1903.

2 SHEETS—SHEET 1.

Witnesses
Elmer Savery
Sarah V. Lockwood

Inventor
Isaac G. Waterman
by Geo. S. Sander
Attorney

No. 802,946. PATENTED OCT. 24, 1905.
I. G. WATERMAN.
ELECTROMAGNETIC VALVE.
APPLICATION FILED JUNE 25, 1903.

2 SHEETS—SHEET 2.

UNITED STATES PATENT OFFICE.

ISAAC G. WATERMAN, OF SANTA BARBARA, CALIFORNIA.

ELECTROMAGNETIC VALVE.

No. 802,946.

Specification of Letters Patent.

Patented Oct. 24, 1905.

Application filed June 25, 1903. Serial No. 163,127.

*To all whom it may concern:*

Be it known that I, ISAAC G. WATERMAN, a citizen of the United States, residing at Santa Barbara, in the county of Santa Barbara and State of California, have invented new and useful Improvements in Electromagnetic Valves, of which the following is a specification.

This invention relates to electromagnetic valves.

In a series of applications heretofore filed by me and in patents heretofore granted to me I have set forth certain electrical systems for controlling the flow of hot and cold water to lavatory-bowls and bath-tubs and certain electromagnetic valves used in connection therewith. These electromagnetic valves are adapted for controlling the flow in a hot or cold water pipe, and separate electromagnetic valves are used for the hot and cold water pipes.

The present invention contemplates the provision of an improved and novel duplex electromagnetic valve which can be connected to both hot and cold water pipes at the same time and used in connection with my electrical systems before referred to or otherwise suitably wired, thus obviating the necessity of using separate electromagnetic valves for the hot and cold water pipes.

A further object of this invention is to provide a novel duplex electromagnetic valve of few parts, compact and durable construction, and reliability of action.

The invention embodies certain improved features and novel adaptations and combinations of elements set forth in detail hereinafter, the novel features being recited in the appended claims.

Figure 1:
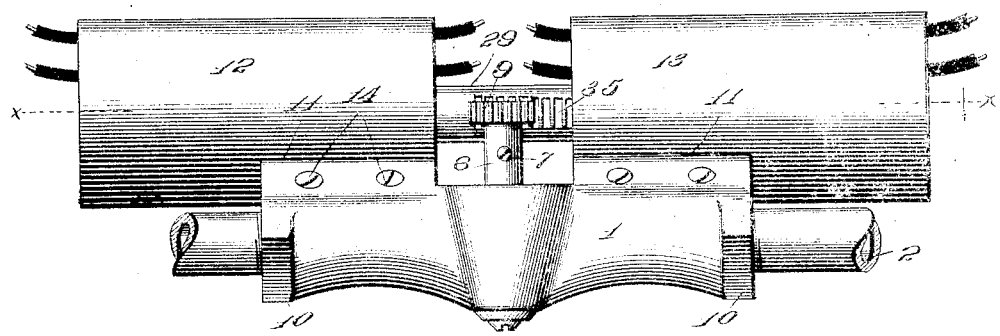
Figure 2:
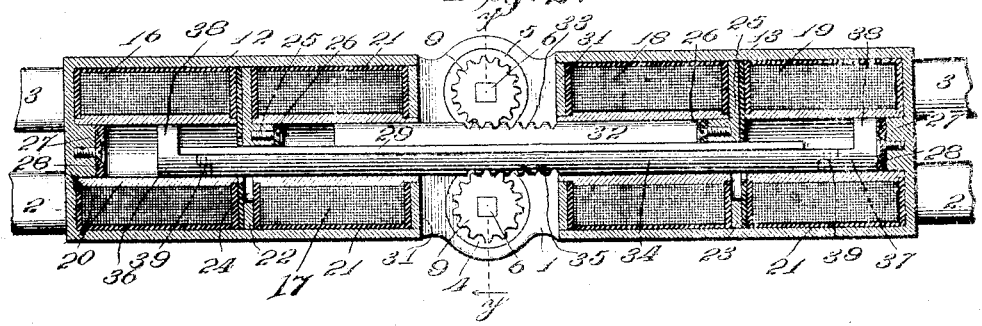
Figure 3:
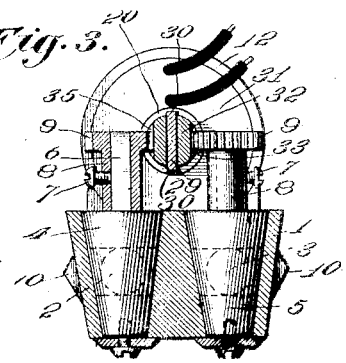
Figure 4:
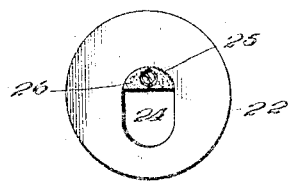
Figure 5:
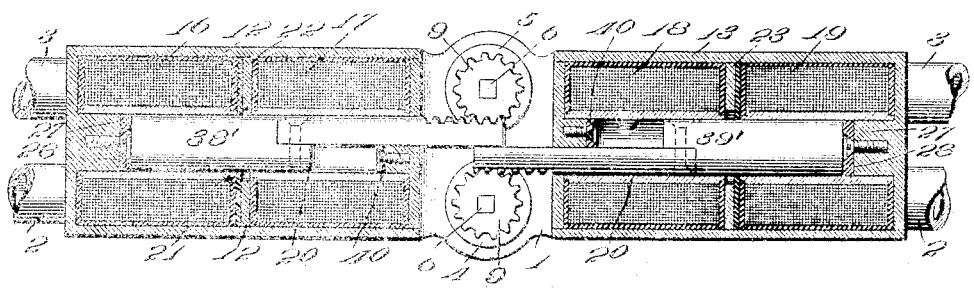
Figure 6:
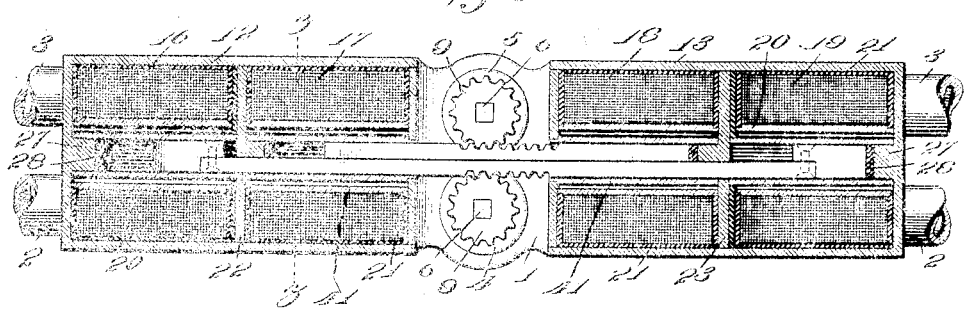

In the accompanying drawings, Figure 1 is a side elevation; Fig. 2, a horizontal section on line X X of Fig. 1; Fig. 3, a cross-section on line $y$ $y$ of Fig. 2, showing certain parts in full lines; Fig. 4, a detail view looking toward the buffer on one of the partition-disks; Fig. 5, a longitudinal section of a modification; Fig. 6, a longitudinal section of another modification, and Fig. 7 a cross-section on line Z Z of Fig. 6.

To the valve casing or shell 1 is connected the delivery and exit cold-water pipes 2 at one side and the delivery and exit hot-water pipes 3 at the other side.

The flow of water through the cold-water pipes 2 is controlled by the turning plug-valve 4, and the flow through hot-water pipes 3 is controlled by the turning plug-valve 5. These valves, which are of ordinary construction, have squared stems 6, on which are secured by screws 7 sleeves 8, having pinions 9.

The ends of the valve-casing are preferably provided with integral nuts 10 to facilitate securing the casing to the pipes, and said casing also has the curved magnet-seats 11, in which the magnet-shells 12 and 13 are secured by screws 14, the cylindrical iron magnet-shells 12 and 13, each containing two solenoids 16 and 17, representing the solenoids in the shell 12, and 18 and 19 the solenoids in shell 13, all of which have their hollow interiors in alinement and provided with brass tubes 20. The solenoids are suitably insulated by insulating material 21.

Interposed between the adjacent ends of solenoids 16 and 17 and between the adjacent ends of solenoids 18 and 19 are the respective partition-disks 22 and 23, having the opening 24 of suitable size to permit easy passage of the armatures therethrough in assembling. These partition-disks have segmental projections 25, faced with buffers 26, which extend into the openings in the respective solenoids. On the heads of the magnet-shells 12 and 13 are projections 27, having buffers 28.

Extending along the longitudinal center of the openings in the solenoids is a flat brass separating and guiding strip or plate 29, whose edges are received in notches 30 in the end plates 31 of the magnet-shells and in similar keyways or grooves in the tubes 20, whereby the said strip is firmly held.

Slidable in the tubes 20 of the solenoids 17 and 18 and on one side of the strip 29 is an armature 32, having its flat side bearing against the strip 29 and provided with a rack 33 on its outer side, which meshes with the pinion of valve 5. This armature is controlled by the solenoids 17 and 18 and limited in its play by the buffers 26.

On the opposite side of the strip 29 and slidable in the tubes 20 is a brass bar 34, whose flat side bears against the strip 29 and on whose rounded outer side is a rack 35, meshing with the pinion of valve 4. To the ends of this bar 34 are secured armatures 36 and 37, which are of the same shape in cross-section as the bar 34, and at their ends they have circular heads 38, filling the inner tubes 20 in the solenoids 16 and 19. These heads are adapted to abut on the buffers 25, which limit their play. The joint 39, between the armatures 36 and 37 and the brass bar 34, can be of any preferred construction, such as the lap-joint shown, and may be brased for greater security.

Assuming the parts to be in the position shown, the valves are both closed. If a supply of hot water is desired, a current is sent through solenoid 17 by using suitable switch mechanism, such as one of the temporary contact-switches of my Patents Nos. 775,016, 775,052, and 775,055, dated November 15, 1904. The armature 32 is then drawn into solenoid 17 until it strikes the buffer 26, which movement turns plug-valve 5 into open position, and the hot water flows through pipes 3. The valve remains open until a current is sent through solenoid 18, whereupon the armature 32 is drawn back into solenoid 18 until the buffer 26 therein is struck, thus rotating valve 5 back to normal position and closing it. If a supply of cold water is desired, a current is sent through solenoid 16, whereupon armature 36 is drawn into said solenoid until buffer 28 is struck, thus turning valve 4 to open position, and the cold water flows through pipes 2. Valve 4 remains in open position until a current is sent through solenoid 19, whereupon armature 37 is drawn into said solenoid until buffer 28 therein is struck, thus turning valve 4 back to closed position.

In the modification shown in Fig. 5 the solenoids 16 and 17 control one armature 38' and the solenoids 18 and 19 control the other armature 39. The movement of the armatures is limited by the buffers 28 and by buffers 40. No separating-strip is necessary, as the buffers 40 guide the armatures.

Figure 7:
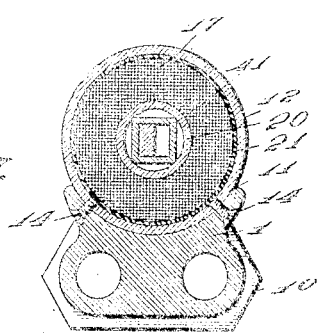

The modification of Figs. 6 and 7 differs from the form shown in Figs. 1 and 2 by the employment of armatures which are rectangular in cross-section, Fig. 7, which move in square tubes 41 inside of the tubes 20, thus dispensing with the separating-strip. The flat sides of the armatures lie against each other.

It will be seen that no locking mechanism for the valves is necessary, as they will remain where turned; also, that I provide in one fixture means for controlling both the hot and the cold water.

Having thus described my invention, what I claim as new, and desire to secure by Letters Patent, is—

1. In an electromagnetic valve, the combination with a rotary valve and a pinion for operating said valve, of an electromagnet, an armature having a rack connected thereto meshing with said pinion and adapted for turning the valve one way, and means for turning the valve the other way.

2. In an electromagnetic valve, the combination with a rotary valve, and a pinion for operating said valve, of an armature having a rack connected thereto meshing with said pinion, and independent electromagnets for moving the armature back and forth.

3. In an electromagnetic valve, the combination with a rotary valve, and a pinion for operating said valve, of independent solenoids, and an armature movable back and forth in said solenoids which has a rack meshing with the pinion.

4. In a duplex electromagnetic valve, the combination with independent valves, of independent armatures for operating the respective valves, a pair of independent magnets for moving one armature back and forth, and a pair of independent magnets for moving the other armature back and forth.

5. The combination with two pairs of independent solenoids, of independent armatures, one armature being moved back and forth by one pair of solenoids and the other armature being moved back and forth by the other pair of solenoids and valves operated by the respective armatures.

6. The combination with two pairs of independent solenoids, all of said solenoids having their openings or centers in longitudinal alinement, of independent armatures, said armatures moving in the solenoids, one armature being moved back and forth by one pair of solenoids and the other armature being moved back and forth by the other pair of solenoids and valves operated by the respective armatures.

7. The combination with two pairs of independent solenoids, all of said solenoids having their openings in longitudinal alinement, of independent armatures, said armatures moving in the solenoids, one armature being moved back and forth by one pair of solenoids and the other armature being moved back and forth by the other pair of solenoids, a separating and guiding strip interposed between the armatures and valves operated by the respective armatures.

8. In a duplex electromagnetic valve, the combination with two pairs of independent solenoids, of independent valves having pinions, and independent armatures having racks connected thereto meshing with the pinions, each of said armatures being moved back and forth by its pair of solenoids.

9. In a duplex electromagnetic valve, the combination with two pairs of independent solenoids, of independent valves having pinions, independent armatures having racks connected thereto meshing with the pinions, each of said armatures being moved back and forth in its pair of solenoids by said solenoids, and a separating-strip interposed between the armatures.

10. The combination with two pairs of longitudinally-alined solenoids, of an armature playing in the intermediate solenoids and controlled thereby, an armature playing in the outer or end solenoids and controlled thereby and valves operated by the respective armatures.

11. The combination with a valve-casing and delivery and exit pipes leading thereto, of a valve, longitudinally-alined solenoids disposed on the valve-casing at one side thereof substantially parallel thereto on opposite
5 sides of the valve, and an armature outside the valve-casing controlling the valve and playing in said solenoids.

In testimony whereof I have signed my name to this specification in the presence of two subscribing witnesses.

ISAAC G. WATERMAN.

Witnesses:
WALLACE R. SEAVEY,
ELMER SEAVEY.